United States Patent

Chapman et al.

[11] Patent Number: 5,553,414
[45] Date of Patent: Sep. 10, 1996

[54] SOIL STERILIZER AND METHOD

[75] Inventors: Maurice I. Chapman, Lincolnshire; David Nicholson, Norfolk, both of England

[73] Assignee: UK Sterilisers Ltd., Norfolk, England

[21] Appl. No.: 278,965

[22] Filed: Jul. 22, 1994

[51] Int. Cl.⁶ ............................................... A01B 77/00
[52] U.S. Cl. ............................................ 47/1.42; 43/140
[58] Field of Search ................................. 47/1.42; 43/140

[56]     References Cited

U.S. PATENT DOCUMENTS 1,444,794  2/1923  Kernan .
1,957,290  5/1934  Railing .
2,602,388  7/1952  Elliott et al. .
2,966,128  12/1960  Toulmin, Jr. .
4,420,901  12/1983  Clarke .
5,271,470  12/1993  King et al. .

FOREIGN PATENT DOCUMENTS 563102   6/1975   Switzerland .
820363   12/1955  United Kingdom .
9401723  1/1994   WIPO .

Primary Examiner—Henry E. Raduazo
Attorney, Agent, or Firm—Dallett Hoopes

[57]     ABSTRACT

Apparatus and method involves lifting at least the top 75 mm of soil from the ground, heating the raised soil to a temperature in the range of 50° C. to 80° C., and discharging the heated soil onto the ground and into the soil.

3 Claims, 5 Drawing Sheets

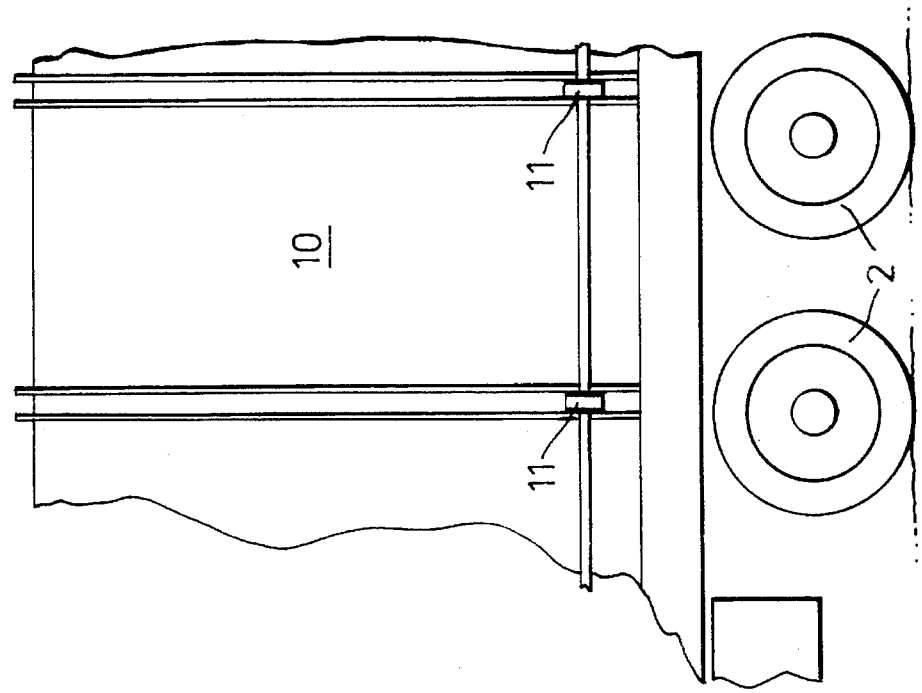
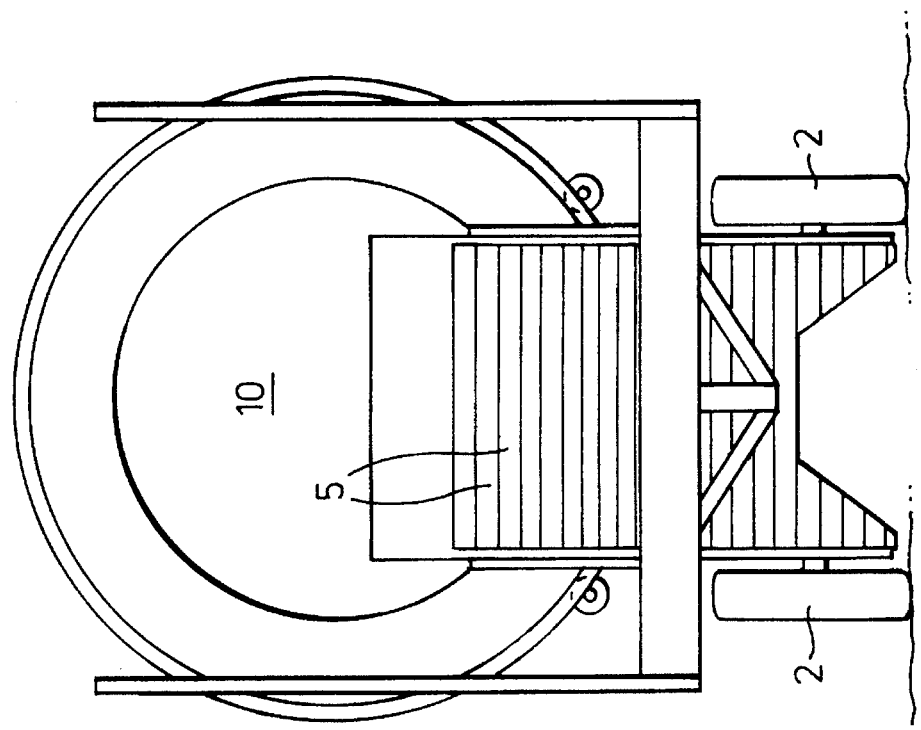

SOIL STERILIZER AND METHOD

BACKGROUND OF THE INVENTION

1. Field of the Invention

This invention relates to soil sterilization. More specifically, the invention relates to sterilizing otherwise highly fertile soil which is badly contaminated with pests which include, but are not restricted to, nematodes i.e. eel worm, and seeds.

2. Description of Related Art

Hitherto it has generally been necessary to either accept the sometimes major reduction in yield or to apply chemical pesticides. In view of the concerns expressed about the environmental and human effects of pesticides there is a considerable need for a nonchemical method of destroying soil-borne pests.

It has been known from old to sterilize mushroom beds by passing steam through perforated pipes in the beds. This method is not suitable for use in fields because of the cost of laying the pipes. Additionally, the control of temperature is very difficult. Parts of the bed will probably be heated too much and the soil structures damaged and the microbiological populations distorted too greatly. Conversely, other parts are likely to be insufficiently heated and thus not freed of infestation.

WO94/01723 published on Jan. 20, 1994 describes a straw burner. Straw is harvested, chopped, and passed to a burner. Combustion gases exiting the device may impinge on the ground. These gases may ignite dry plant material on the surface and possibly over-heat the top-most part of the soil. It is unlikely that any effect will be present lower down.

SUMMARY OF THE INVENTION

The invention seeks to provide a soil sterilizer capable of sterilizing substantially the whole of that part of the soil which is infected.

According to the invention, there is provided apparatus for destroying soil borne pests comprising:

i a lift for raising at least about the top 100 mm of soil from the ground ii a heater for heating the raised soil to a temperature in the range of about 50° to 85° C.

iii a discharger for discharging the heated soil onto the ground.

According to the invention, there is also provided a method of destroying soil borne pests comprising:

a) lifting at least about the top 100 mm of soil from the ground b) heating the raised soil to a temperature in the range of 50° to 85° C.

c) discharging the heated soil onto the ground and into the soil.

Before describing the embodiments of the invention it will be helpful to review the experimental data which assisted in devising the apparatus.

The first step was to determine what temperature would destroy common pests. It is well known that some plant seeds are highly resistant to temperature and indeed may require exposure to flame to germinate. However, the effect of heat on snails, nematodes, and the like which we regarded as our major enemy was not so far as we were aware known.

We first studied the effect of heat on the potato cyst nematode *Globodera pallida*. The results are shown in FIG. 1. As can be seen, temperatures in excess of 55° C. are almost immediately fatal. Rapid destruction also occurs at about 47° C. Thereafter, the survival time becomes much greater, and at temperatures below about 40° C. survival may be indefinite.

We next looked at the chrysanthemum nematode *Aplenchioides ritzemabosi*. The results are shown in FIG. 2. The results are broadly similar in that 55° C. resulted in almost instantaneous destruction, and 40° C. was survivable for a considerable time.

We next looked at the resting sclerotia phase of onion white rot *Sclerotium cepivorum* which we anticipated to be the most resistant form. The results (FIG. 3) were in line with our previous findings. A temperature of 40° C. is survivable, and a temperature of 50°–55° C. almost instantly fatal.

We next looked at the garden slug *Arion hortensis*, and found that it could be rapidly destroyed above 43° C.

It thus became clear to us that if we could reliably heat soil to a temperature in excess of about 45° C., we would destroy almost all deleterious organisms. This heating would also destroy the broadly beneficial earthworm spp. In fact, this is not the problem it might at first appear to be. The earthworm is rather mobile, and not all the earthworms present would be destroyed; many would be beneath the treated layer. Sir E. John Russell, for example, comments in "The World of the Soil" Collins New Naturalist that *Lumbricus terrestis* burrows to a depth of 5 feet to escape danger. These survivors and their offspring would find an abundant food supply, and thus proliferate.

Conversely, the majority of soil borne pests are slow moving and/or confined to the upper area of the soil.

We next studied the effect of heat on soil. If heated too much, the soil structure was badly damaged. At lower but still high temperatures, changes in the ratios of nitrogen-containing compounds could change leading to an increase in the amount of ammonia relative to nitrate and consequent PH changes. Temperatures less than about 100° C. rarely caused major problems. Heating substantially the whole growing zone to a temperature in the range of about 45° C. to about 100° C. would sterilize the soil. As a practical matter, temperatures as high as 100° C. confer no significant advantage which is not outweighed by the cost of heating so hot. Conversely, heating to only 43° C., while attractive from the point of view of economy of operation, might result in cold spots for example in the centers of clods which were not sterilized. A preferred temperature range was deduced to be about 45° C. to 75° C., more preferably about 50° C. to 70° C., still more preferably about 55° C. to 65° C., yet more preferably 57° C. to 62° C.

BRIEF DESCRIPTION OF THE DRAWINGS

Other objects and features of the invention will be apparent from a review of the following specification and the accompanying drawings all of which disclose non-limiting embodiments of the invention. In the drawings:

FIG. 6 is a right side elevation;

FIG. 7 is an enlarged fragmentary side elevation diagrammatically showing the wheels and support means for the drum;

DESCRIPTION OF THE PREFERRED EMBODIMENT

Figure 2:
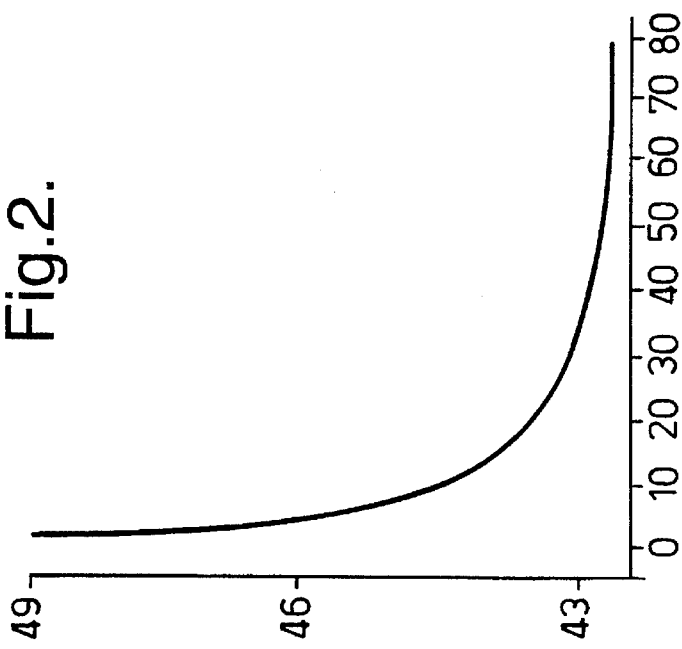
FIG. 2 is a graph similar to FIG. 1 for a different organism.
Figure 1:
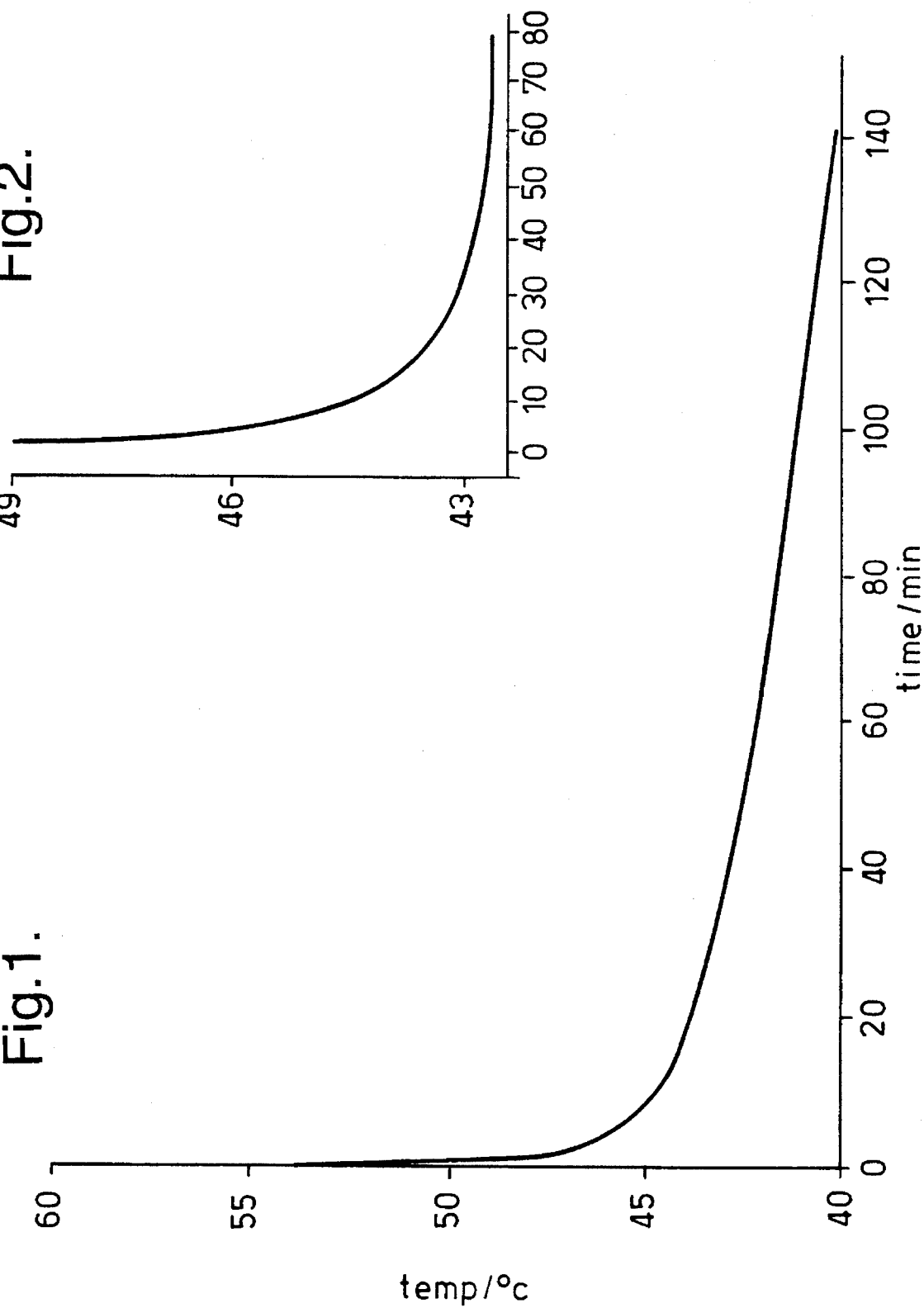
FIG. 1 is a graph showing time versus temperature indicating how long an organism, recited below, must be subjected to a given temperature to be fatal to it.
Figure 3:
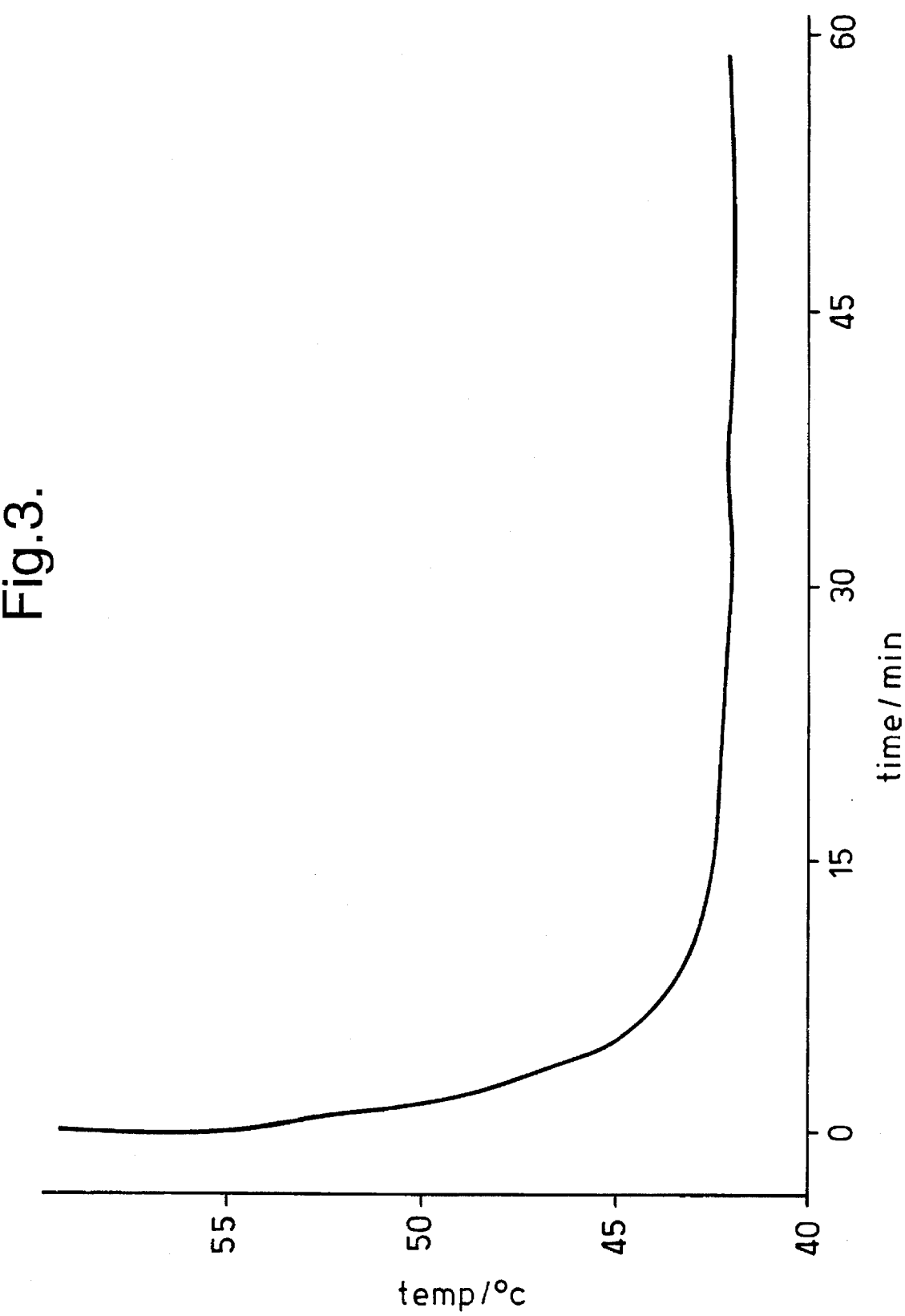
FIG. 3 is a graph similar to FIGS. 1 and 2 for a still different organism, recited below.
Figure 4:
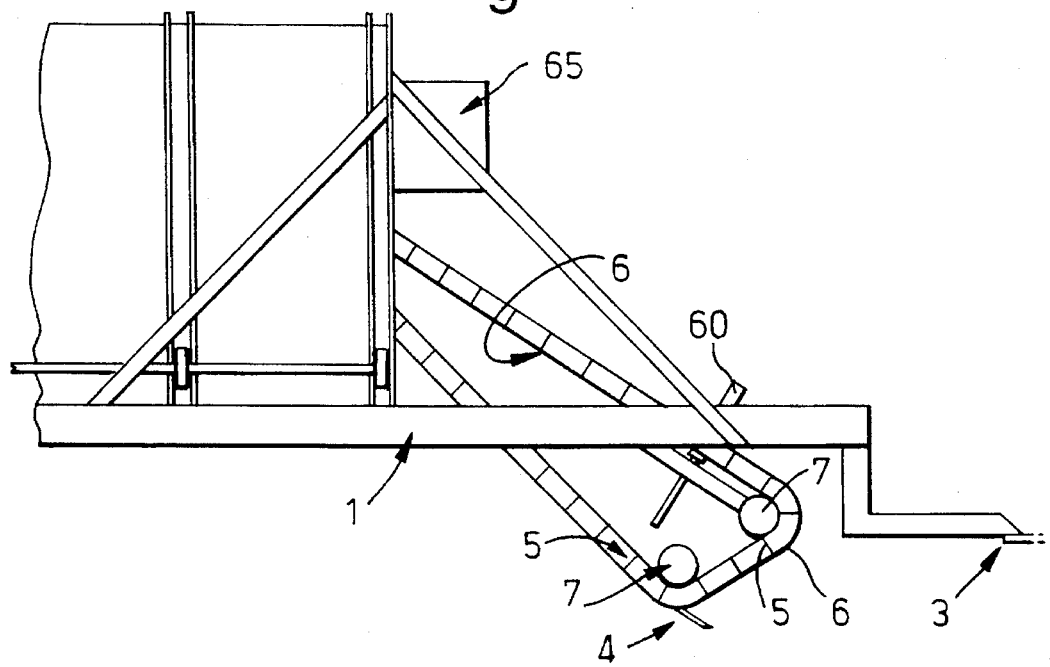
FIG. 4 is a fragmentary side elevational view of the inlet end of an apparatus in accordance with the invention.
Figure 5:
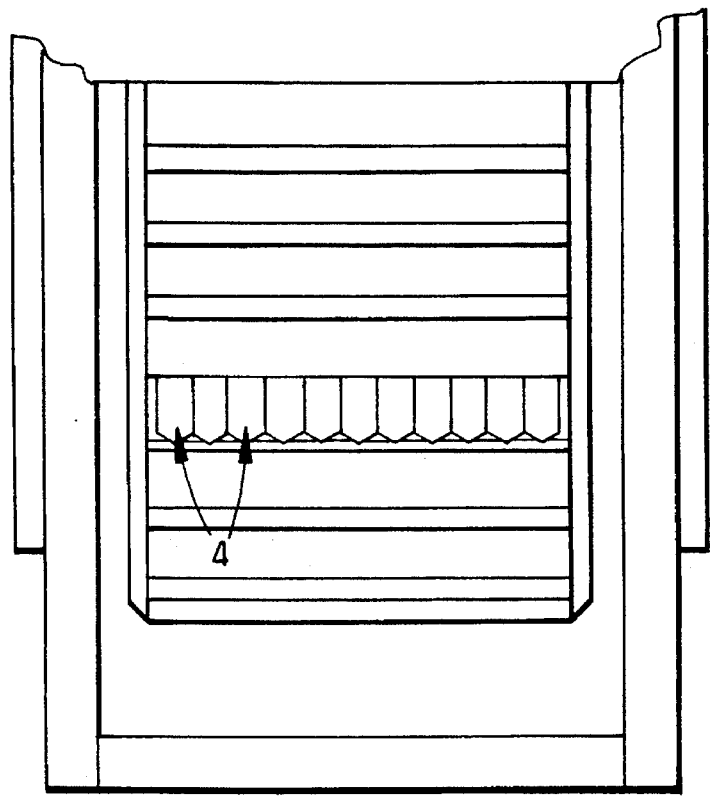
FIG. 5 is a bottom plan view of an apparatus of FIG. 4.
Figure 8:
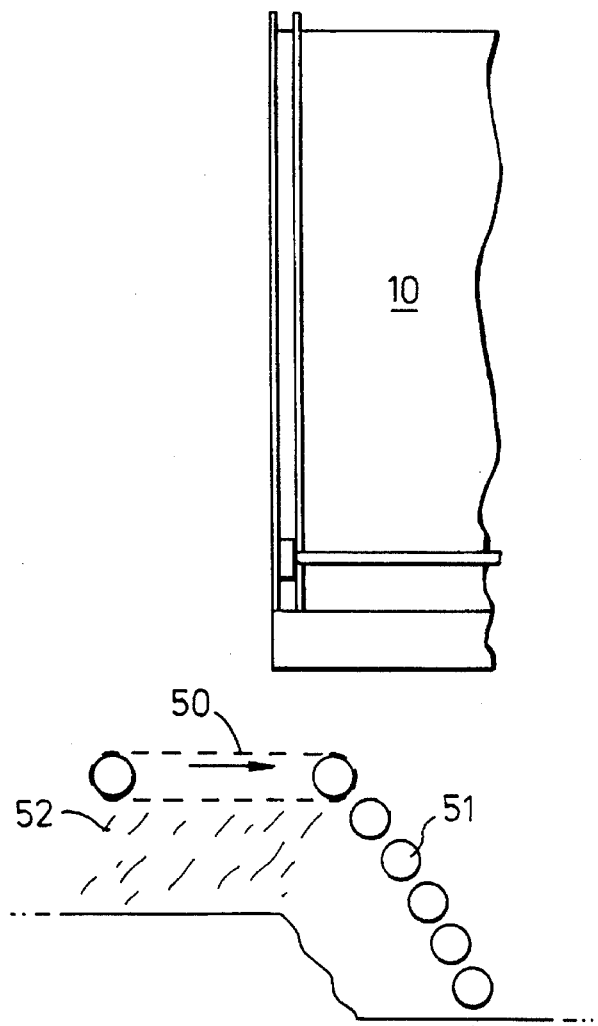
FIG. 8 is a fragmentary view diagrammatic of the outlet end of an apparatus of the invention.
Figure 9:
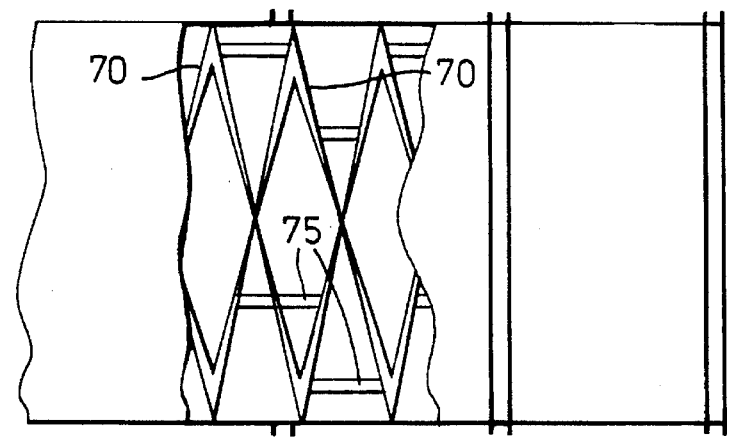
FIG. 9 is a side elevation of the drum with a portion broken away to show the wave structure inside the drum.

An embodiment of the invention is shown partially in FIG. 4. This particular embodiment is intended to be tractor driven or winched, but it is within the scope of the invention for the apparatus to be locomotive.

The device shown has a chassis 1 conveniently of welded box girder construction. In this embodiment, the chassis is mounted on a double steerable axle 2 (FIG. 7). Those skilled in the art will have no difficulty in devising other ways of mounting the chassis such as tracks or non-steered axles. Because the illustrated embodiment is tractor hauled, it is provided with a tow-hitch 3.

The device can be provided with a share 4. In the embodiment, the share has a plurality of shaped removable tips. This is not necessary, and in some embodiments a single share is used.

A pick-up assembly can be provided. In the embodiment illustrated, the pick-up comprises a plurality of cleats 5 carried on endless chains 6 which run on sprockets 7. A guide plate 8 is provided in the embodiment to prevent soil from falling back to the ground. The chains and hence the cleats are driven, in this embodiment, by hydraulic motors. Other drivers will suggest themselves to the skilled. They may include power take-off from a towing vehicle, mechanical, or electrical drive.

A depth control 60 for adjusting the depth of the pick-up assembly may also be provided. In the embodiment shown, this comprises a pair of hydraulic rams 60 having one end mounted on the chassis and one end on the pick-up assembly. In the illustrated embodiment, the share and pick-up assembly pick up a strip of soil about 1.5 m wide and up to 450 mm deep. The precise depth required depends on the top soil depth. Preferably at least 75 mm, more preferably at least 100 mm may be picked up. In some embodiments, up to 150 mm, 200 mm, 300 mm, or 400 mm may be picked up.

Although not shown in the illustrated embodiment, it may be desirable to provide for soil pretreatment at this stage. One example of a possible pretreatment may be separating stones from the soil. Stones are clearly not infected by soil-borne pests, and so there is no significant advantage in heating them: by separating the stones, a degree of fuel saving may be achieved. Conveniently separated stones are discharged into the trench left by the pick-up assembly where they will be buried by material exiting the device.

It may be desirable to provide a clod-breaker, for example, to break substantially all the soil into clods less than about 100 mm preferably less than about 50 mm. Soil is not a good conductor of heat (as will be rather spectacularly described hereinafter). Therefore, if the exterior of a clod is heated to say 80° C., the interior may not reach the important 45° C. without a very considerable soak time. It is possible that pockets of infection will remain.

A rather prominent feature of the illustrated embodiment is drum 10. In the embodiment shown, the drum is generally horizontal, but as will be described hereinafter, the drum 10 is about 9.35 mm long and 3 m in diameter. The drum is made of a moderately heat resisting material such as mild steel.

In the particular embodiment, the drum 10 is supported on bearings comprising wheels 11 running in U-channel 12 carried on the drum. The drum is rotatable. One way of rotating the drum is to provide a rim gear (not shown) around the drum. A pinion (not shown) can then be used to rotate the drum either directly or via an endless chain. By way of example, the pinion can be driven by a hydraulic motor, electric motor, or i.c. engine.

The drum 10 is in this embodiment provided with external insulation. Although desirable from the point of view of reducing running costs, insulation is not essential. Those skilled will have little difficulty in arranging insulation if required. As will be explained in more detail hereinafter, in some embodiments of the invention, heat is applied to the exterior of the drum. In this case, insulation may be appropriate.

A heat source is provided. We envisaged great difficulty with the heat source. Many food plants are exceptionally sensitive to taint. Even small quantities of say diesel fuel present in soil used for growing carrots can result in a noticeable taste in the foodstuff. Steam heating could be used as could a fluid transfer heat exchanger, but it can be difficult to arrange for the large energy transfer.

Taint can be avoided by heating the outside of the drum and thus separating it from the soil. More conveniently and more surprisingly, it has been found that taint can be avoided even when the heat source is contained within the drum 10. One way of achieving this is by directing the exhaust gases of a burner 65 (FIG. 4) along the inside top of the drum and causing the drum to rotate. The drum is heated by the flame and exhaust gases. The heated portion rotates and contacts the soil heating it. The heated portion cools and then moves back to the heating zone. In this way, the exhaust gases do not contact the soil to any great degree substantially reducing or eliminating taint. Because of the high heat output of the heat source, care must be taken to prevent the drum from being burnt out. One way of achieving this is to provide a series of marks around the drum circumference and an optical detector on the frame. While the drum rotates, a cyclical signal will be output from the detector, and, when it stops, a steady signal will be output. The heat source can be arranged to be shut down in the absence of a cycling signal from the detector.

In the particular embodiment, an oxidizing flame gas oil or diesel fuel burner was used. It is however to be clearly understood that this is not the only fuel which may be employed. At the time of writing, European farmers are entitled to a land-subsidy if food crops are not grown. The land may be left fallow or it may be used to grow non-foodstuffs. The subsidy may be lawfully claimed if say oil seed rape is grown for non-food use. The seed may be pressed for rape oil which is usable as fuel in the invention as may be the dry matter. Another crop which may be grown while claiming the so called "set-aside" subsidy is willow. The willow produces a useful crop after about three years, and, by coppicing the crown, are almost immortal.

To promote heat transfer, it is preferable that a baffle be provided within the drum. A preferred baffle is a helical strip mounted on the inside of the drum. A multistart, for example two start, helix 70 may be used. In the embodiment of the invention illustrated a two start helix of 1.2 m pitch may be employed. The shoulder to crest height of the helix varies in this embodiment from 0.3 m at the burner end to 1 m at the discharge end. Even better heat transfer can be arranged by disposing a plurality of paddles preferably triangular or trapezoidal in plan inside the drum so as to define a helix but with passages to allow the hot exhaust gases to pass through. The helix if present also serves to transfer the soil from the input end to the outlet end. Transport can also be arranged by other means such as inclining the drum to the horizontal.

When the drum is arranged in this manner, we found sometimes that the soil heating was a little uneven and the drum tended to wear a little faster that we had hoped. Careful study of the motion of the soil in the drum revealed that this was because the soil slid along the drum. By continued experiment, we came to realize that if the soil were agitated in the drum more, even heating could be arranged. Further testing and experimentation showed that a particularly simple way of obtaining good agitation was to fix laterally extending trip plates 75 at intervals inside the drum. A convenient trip plate is a length of angled iron positioned with the legs abutting the drum and the angular portion directed toward the center of the drum. As the drum rotates, the soil tends to form a bank inside the drum and partially up one side. In the absence of a trip plate, a steady state can be reached with no soil mixing. The trip plates cause the soil to cascade resulting in good mixing and little sliding contact between the drum and the soil. This means that more even heating and less wear were obtained. Additionally, we believe that at least some of the larger organisms in the drum may be killed or injured by the cascading soil.

It may be advantageous to provide two or more drums. The first drum can transport soil away from the pick-up, and the second can return the soil toward it. A convenient way of achieving this is to make the two drums coaxial with one inside the other. Soil is loaded into the first, inner, drum and discharged into the second, outer, drum. By making the helixes if present of opposite hand the two drums can rotate in the same direction. The second drum forms, in effect, the insulating jacket of the first drum.

The treated soil is discharged from the drum and, if desired, may be subjected to post treatment. In some embodiments, the treated soil is transported back to a point just behind the pick-up. In some embodiments, especially where the lateral speed of the soil in the drum is approximately equal to the ground speed of the device this will not be so important. In some embodiments, the soil is discharged onto a foraminous conveyor belt 50. Clods and stones 51 too large to pass through the mesh are transported toward the pick-up and discharged into the gully made by the pick-up. The tilth 52 falls through the mesh and buries the clods and stones.

In some embodiments, the discharged soil is then smoothed by a plate. This plate can induce the soil to form a crust and thus retain heat even longer.

Treatment may not be required every year. A typical regimen which is proposed in complete treatment every five years with slightly more frequent, say every two or three years, treatment of field edges and entrances.

The treatment is generally highly cost effective since it renders land previously unusable for many crops usable. By way of example, a fenland field valued at about £7500 per hectare after treatment. An estimate of the cost of buying the illustrated embodiment, together with its running and depreciation costs together with the cost of labor and use of a ridging machine is estimate at around £1300 per hectare.

A field of typical fenland type was chosen; the soil was light and peat-based. In view of its fertility, it had been used to grow a wide range of crops for many years, and was badly infected with a wide range of nematodes, fungle pests, and twitch.

The field was first pretreated using a ridge to form ridges about 1.5 m wide and 0.3 m deep. The field was then notionally divided into several parts. One part was left in the ridges state. A second part was heated in accordance with the invention to 50° C. The top 300 mm were treated. A third part was treated in the same manner as the second, but heated to 60° C. A fourth part was heated in the same way but to 70° C.

Each section was monitored for nematodes. The untreated section was infected. Substantially all the nematodes were destroyed in the treated section. After about one hundred hours, the temperature of the first plot (untreated) and the fourth plot (70° C.) were taken. The first plot was at a fairly constant 12° C. The surface of the fourth plot was around 12° C., but to our considerable surprise, the temperature increased with depth to a maximum of about 18° C. and then fell off. For many plants, this constitutes a positive benefit in promoting germination.

Parts of each plot were then planted with a range of plants and part left unsown. Weeds rapidly germinated in the untreated plot and twitch sprouted. The plot treated at 50° C. was substantially less infested by weeds, but after some time the twitch grew strongly. In the 60° C. and 70° C. treated plots, there was little or no weed infestation.

The plants grown in the untreated plot were almost overwhelmed by weeds unless weed killer was used. Where weed killer was used, plants grew well. On the treated plots, the plants grew well, and, in some cases such as celery, better than on the untreated plot.

It will be apparent to those skilled in the art that means of heating the soil other than in a rotating drum can be employed. For example, the combustion gases could be passed through pipes covered by lifted soil. By agitating the lifted soil, even heating would ensue.

Variations in the invention are possible without departing from the spirit of the invention. Thus, while the invention has been shown in only a single embodiment, it is not so limited but is of a scope defined by the following claim language which may be broadened by an extension of the right to exclude others from making or using the invention as is appropriate under the doctrine of equivalents.

What is claimed is:

1. Apparatus for destroying soil-borne pests comprising:
    a) frame means;
    b) mobility means mounted on and supporting the frame means for movement of the frame means in a given direction;
    c) a hollow drum having a boundary wall rotationally supported on the frame means about a substantially horizontal axis parallel to the given direction, the drum having a forward and rearward end;
    d) ground-engaging means supported by the frame means for continuously removing at least about the top 100 mm of soil from the ground in the path of the apparatus as the frame means moves in the given direction;
    e) a continuous conveyor supported on the frame means for moving the removed soil from the ground-engaging means and delivering it to the forward end of the drum;
    f) flame-and-exhaust-gas-producing means in an end of the drum directed inward of the drum along the upper portion of the drum to heat the wall of the drum;
    g) means for moving the removed soil from the forward end of the drum to the rearward end toward discharge including helical baffle means fixedly secured to the wall of the drum add extending toward the axis and having trip plates also affixed to the wall longitudinally of the drum between adjacent sections of the helical baffle means, whereby the helical baffle means serves to convey the removed soil and also to arrest the flow of flame and exhaust gas along the upper portion of the rotating drum to expose said wall for a longer period to the heat of the flame and gas and more efficiently increase the temperature of the wall, and the trip plates serve to tumble the removed soil to assure thorough contact of the soil with the hot wall.

2. An apparatus as claimed in claim 1 wherein the trip plates each comprise a length of right angle iron having its vertex directed toward the axis and the ends of the legs secured to the wall.

3. Apparatus for destroying soil borne pests, the apparatus comprising:
   a) a lift means for raising at least about the top 100 mm of soil from the ground;
   b) means for transferring said raised soil into a rotatabl heating drum, said heating drum having a helical internal baffle fixed relative to the drum and a plurality of longitudinally extending trip plates;
   c) means for heating an upper surface of the drum;
   d) means for rotating the heated upper surface of the drum into contact to heat the soil to a temperature in the range of about 45° to 85° C.; and
   e) a discharge for discharging heated soil onto the ground.

* * * * *